United States Patent [19]

Oldengott et al.

[11] Patent Number: 4,669,674

[45] Date of Patent: Jun. 2, 1987

[54] FEEDER BOX FOR A MOBILE TRANSFER STATION

[75] Inventors: Michael Oldengott, Witten; Jörg Schade, Herten; Peter Stephan, Oer-Erkenschwick, all of Fed. Rep. of Germany

[73] Assignee: Klockner-Becorit GmbH, Fed. Rep. of Germany

[21] Appl. No.: 662,036

[22] Filed: Oct. 18, 1984

[30] Foreign Application Priority Data

Oct. 19, 1983 [DE] Fed. Rep. of Germany ... 8330075[U]
May 30, 1984 [DE] Fed. Rep. of Germany ... 8416513[U]

[51] Int. Cl.$^4$ ................................................ B03B 7/00
[52] U.S. Cl. .................................. 241/101.7; 222/163; 414/574; 414/327; 414/356
[58] Field of Search ............... 414/304, 325, 327, 351, 414/501, 573, 574, 356; 222/163; 241/101.7

[56] References Cited

U.S. PATENT DOCUMENTS

| | | | |
|---|---|---|---|
| 3,378,152 | 4/1968 | Warner | 414/574 |
| 3,606,050 | 9/1971 | Silver | 414/574 |
| 3,648,859 | 3/1972 | Johnson | 414/304 X |
| 3,830,357 | 8/1974 | West et al. | 414/574 X |

FOREIGN PATENT DOCUMENTS

| | | | |
|---|---|---|---|
| 2914832 | 10/1980 | Fed. Rep. of Germany | 414/573 |
| 758372 | 10/1956 | United Kingdom . | |
| 2021527 | 12/1979 | United Kingdom | 414/574 |

Primary Examiner—Frank E. Werner
Attorney, Agent, or Firm—Watson, Cole, Grindle & Watson

[57] ABSTRACT

A feeder box for dumping bulk materials onto a conveyor of a mobile transfer station comprises at least one feeder device located adjacent a side of the conveyor, each feeder device including a box compartment and a support structure for the box compartment, the box compartment being pivotable with respect to the support structure so as to tilt towards the conveyor to dump bulk materials onto the conveyor.

4 Claims, 16 Drawing Figures

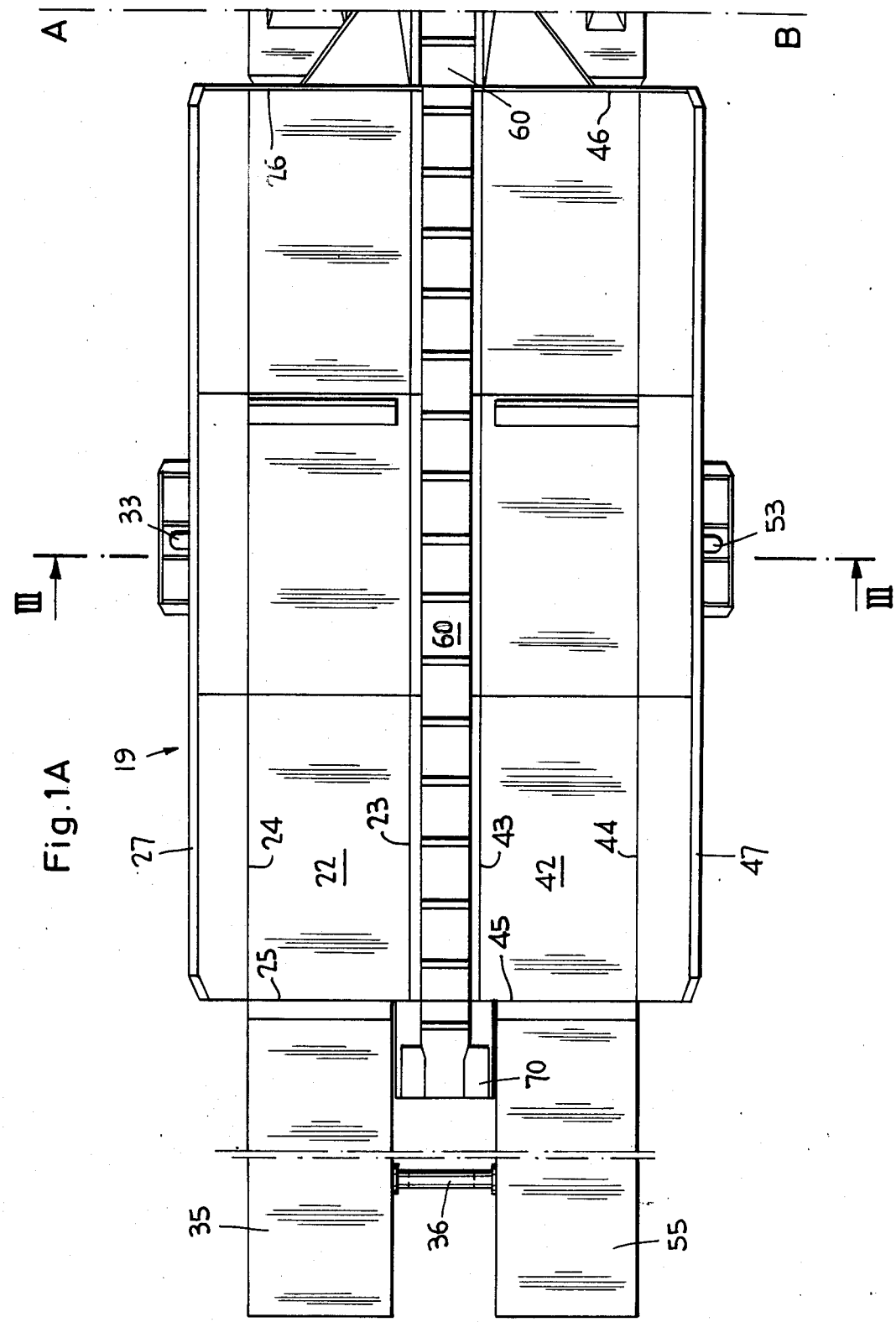

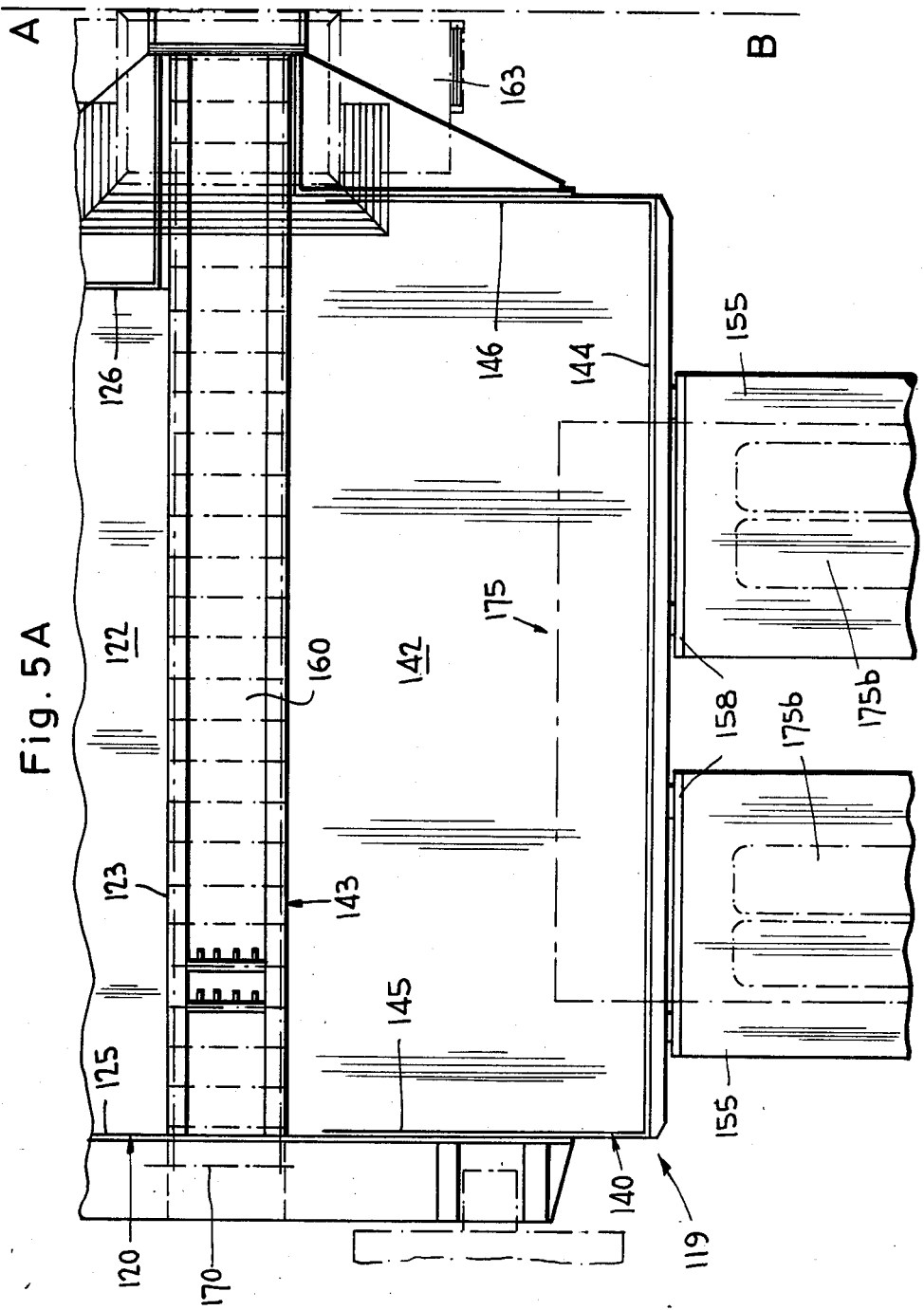

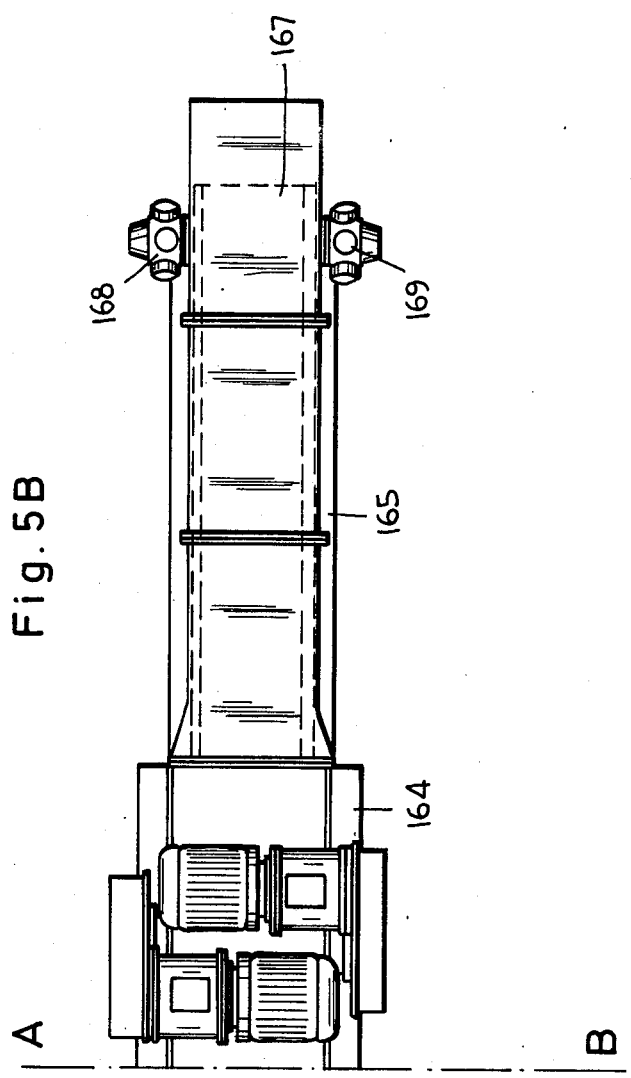

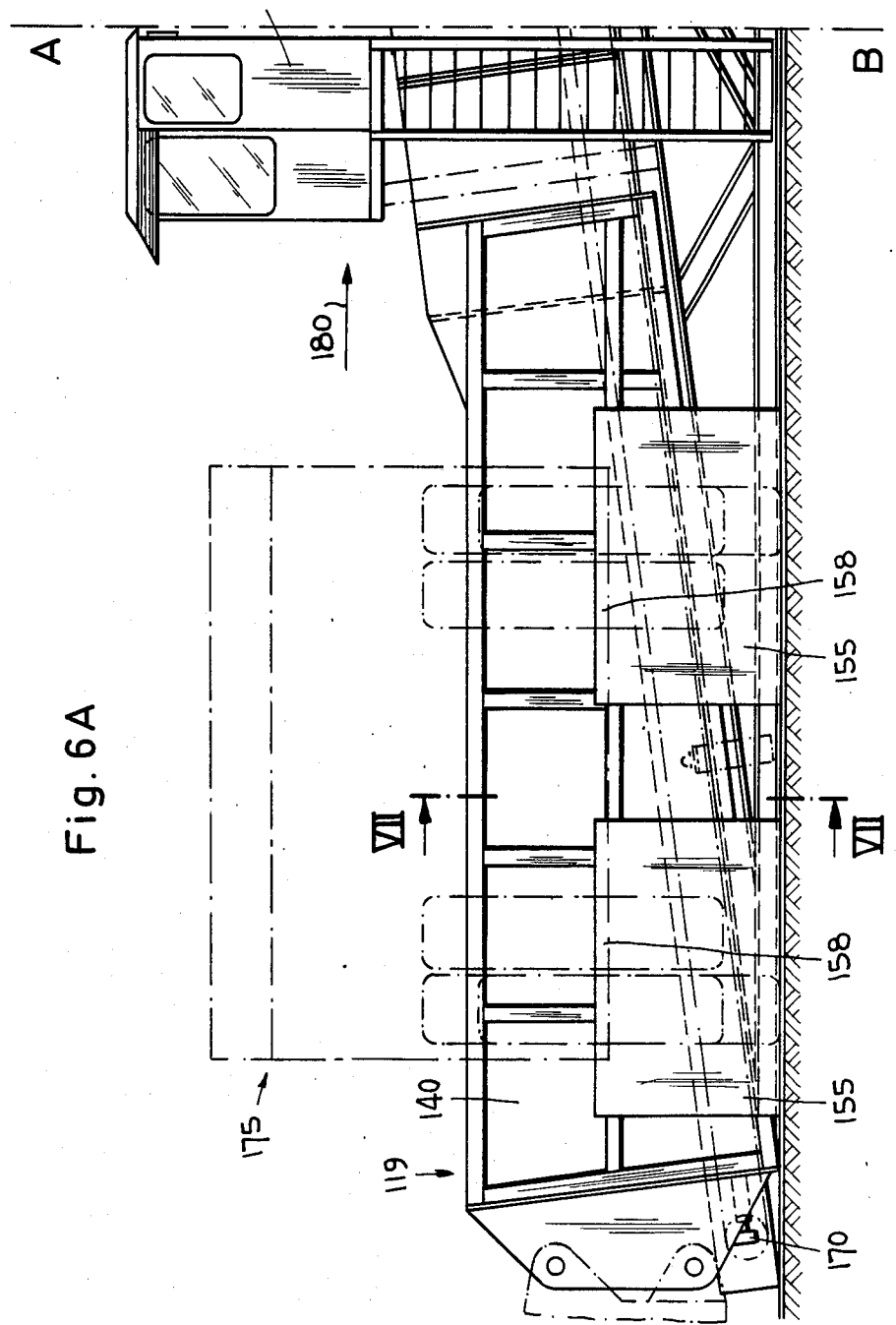

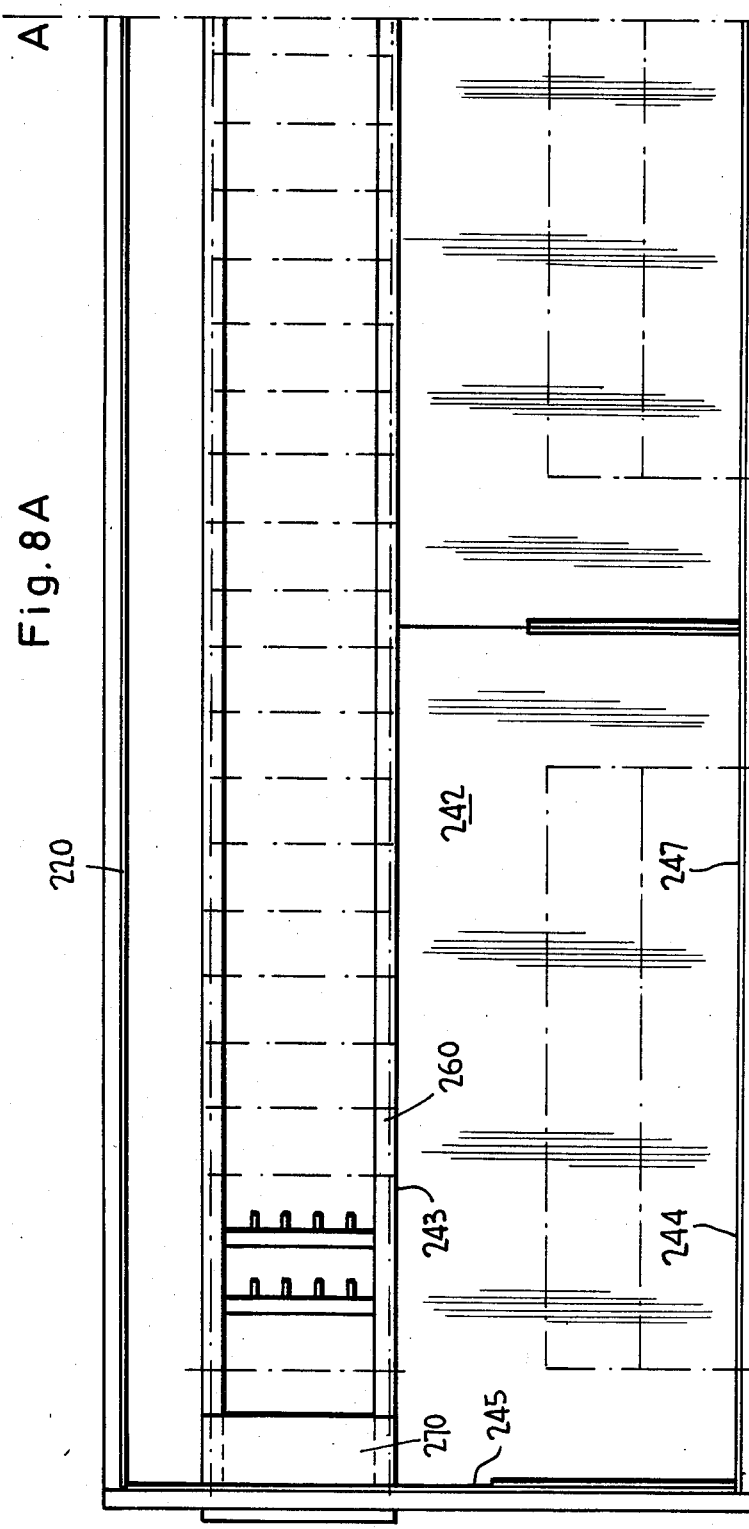

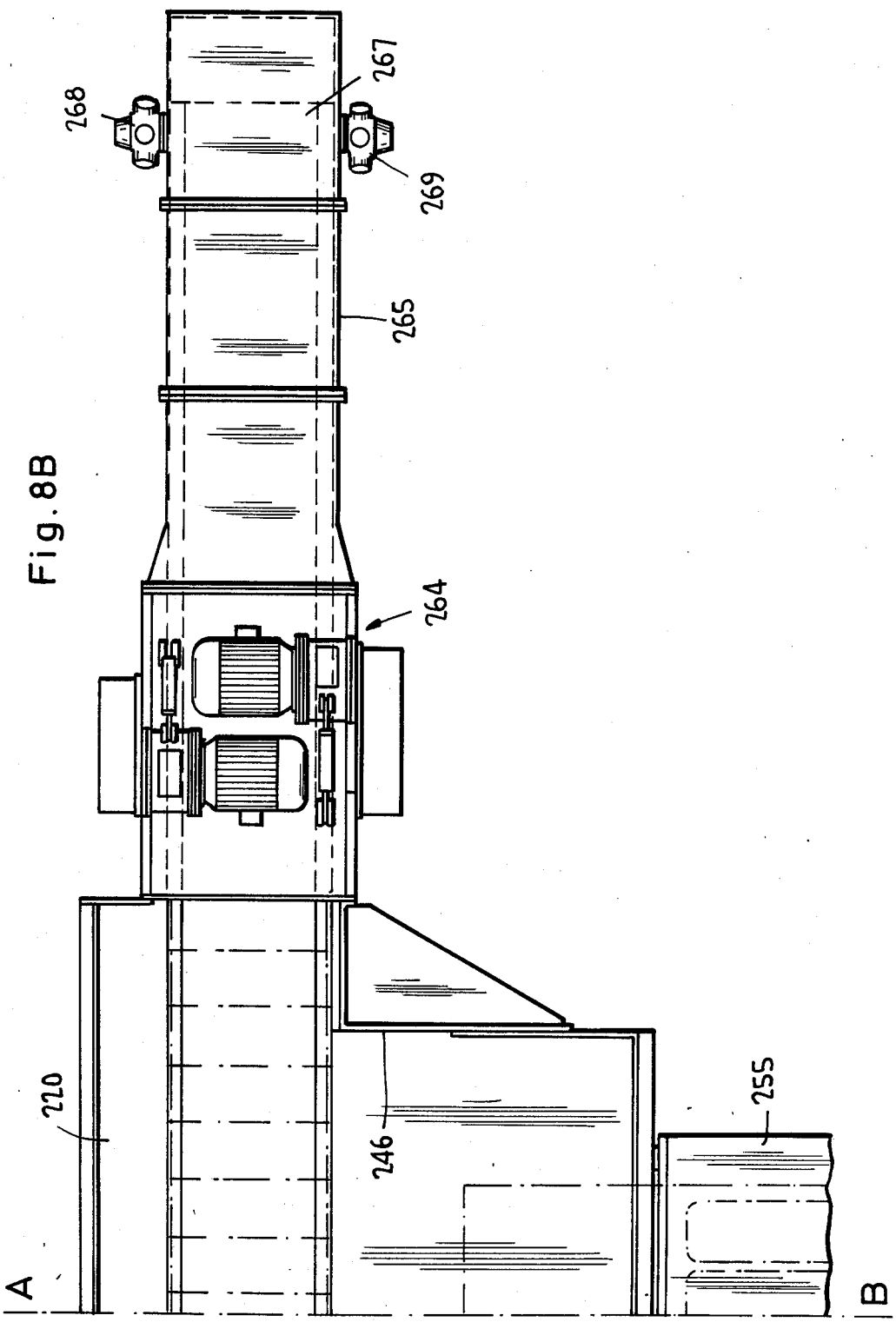

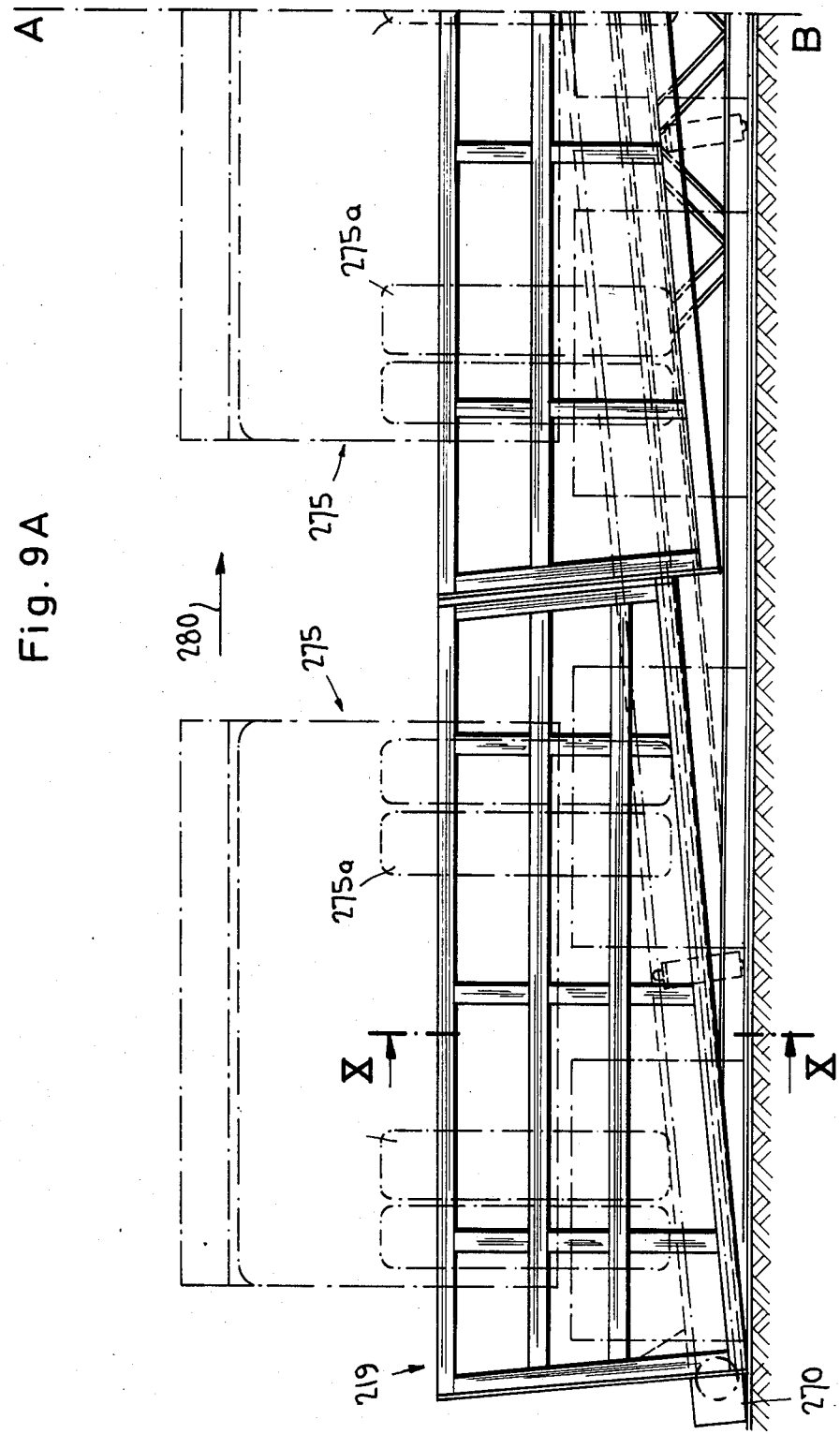

ature-enable the feeder device to be used even though

FEEDER BOX FOR A MOBILE TRANSFER STATION

BACKGROUND OF THE INVENTION

1. Field of the Invention

The present invention relates to a feeder box which can receive and pass bulk materials onto a conveyor of a mobile transfer station.

2. The Prior Art

A known feeder box for receiving and delivering bulk materials to a continuously moving conveyor of a mobile transfer station constructed as a mobile crusher system has its lower end designed as a funnel, i.e., its lower walls are constructed to slope in an inclined manner towards one another. Such a feeder funnel extends to a great height above the moving conveyor, thus requiring the use of very tall ramps for enabling trucks carrying the bulk materials to be crushed to back up to the mouth of the feeder funnel so as to deposit the bulk materials therein.

SUMMARY OF THE INVENTION

The object of the present invention is to provide a feeder box for a mobile transfer station which can receive and then deposit a large amount of material onto a continuously moving conveyor of the mobile transfer station, yet will have lower walls than the prior art feeder funnels, thus, among other advantages, eliminating the need to use tall ramps therewith.

According to one preferred embodiment of the present invention, the feeder box includes two feeder devices located on corresponding opposite sides of the endless conveyor (e.g., a scraper chain conveyor) of a mobile transfer station, each feeder device including a box compartment and a support structure therebelow. Each box compartment includes a floor, a first side of which is located adjacent the endless conveyor and a second, opposite side of which is remote therefrom, and a side wall which is rigidly connected to the floor to extend upwardly from the noted second side thereof. The first side of each floor can include a downwardly sloped lip. Each support structure includes an arm which extends towards and above the associated side of the conveyor and a lateral end which extends away from the conveyor. A pivot means at the end of the noted arm pivotally supports the floor of the box compartment thereabove. A lifting cylinder is connected between the lateral end of the support structure and the side wall of the box compartment to determine whether the box compartment will be in a non-tilted orientation wherein it rests on the support structure therebelow, its floor being in a generally horizontal orientation (in this orientation the box compartment is ready to accept bulk materials therein), or in a tilted orientation, such that any bulk materials therein will be discharged onto the adjacent endless conveyor. Each feeder device includes a ramp located at its upstream end to enable a dump truck carrying the bulk materials to be processed to back up onto the floors of the box compartments, i.e., when in their non-tilted orientations, and deposit the bulk materials therein.

In another preferred embodiment of the invention, the feeder box will include two feeder devices located on corresponding opposite sides of the endless conveyor of the mobile transfer station, each feeder device including a box compartment and a support structure therebelow. Each box compartment includes a floor, a first side of which is located adjacent the endless conveyor and a second opposite side of which is remote therefrom, and a side wall which is rigidly connected to the floor to extend upwardly from the noted second side thereof. Each support structure includes a first arm which is the associated side of the endless conveyor, a bottom plate and a second arm extending away from the conveyor. A pivot means in the upper end of the first arm pivotally supports the floor of the box compartment thereabove. A lifting cylinder is connected between the bottom plate and the floor of the box compartment to determine whether the box compartment will be in its non-tilted orientation or in its tilted orientation. Each feeder device includes at least one ramp located beyond the side wall of the box compartment, each ramp being pivotally connected to the second arm of the support structure to enable a dump truck to back up to the side wall of the box compartment, i.e., when the box compartment is in its non-tilted orientation, and dump the bulk materials therein over the side wall and onto the floor of the associated box compartment. The pivotal attachment of each ramp to the associated structure enables the feeder device to be used even though the ground thereunder may be uneven.

In a third preferred embodiment, the feeder box comprises at least one feeder device located on one side of the endless conveyor, each feeder device being constructed similarly to those used in the above-noted second embodiment, and a stationary wall on the opposite side of the endless conveyor, the stationary wall extending above the associated side of the conveyor. This embodiment of the invention is useful when the ground on which the mobile transfer stations is located is so uneven that the positioning and loading of feeder devices on both sides of the endless conveyor is not possible.

The invention will now be better understood by reference to the accompanying drawings taken in conjunction with the following discussion.

DESCRIPTION OF THE DRAWINGS

In the drawings,

FIG. 1A shows a partial plan view of the left side portion of a crusher system which includes a feeder box constructed in accordance with a first embodiment of the present invention, FIG. 5A shows a partial plan view of the left side portion of a crusher system which includes a feeder box constructed in accordance with a second embodiment of the present invention, FIG. 5B shows a plan view of the right side portion of the crusher system shown in FIG. 5A, this right side portion of the crusher system being a continuation of the left side portion at line A-B, FIG. 6A shows a side elevation of the left side portion of the crusher system that is shown in FIG. 5A, FIG. 8A shows a plan view of the left side portion of a crusher system which includes a feeder box constructed in accordance with a third embodiment of the present invention, FIG. 8B shows a plan view of the right side portion of the crusher system shown in FIG. 8A, this right side portion of the crusher system being a continuation of the left side portion at line A-B, FIG. 9A shows a side elevation of the left side portion of the crusher system that is shown in FIG. 8A.

DESCRIPTION OF THE PREFERRED EMBODIMENTS

Figure 1B:
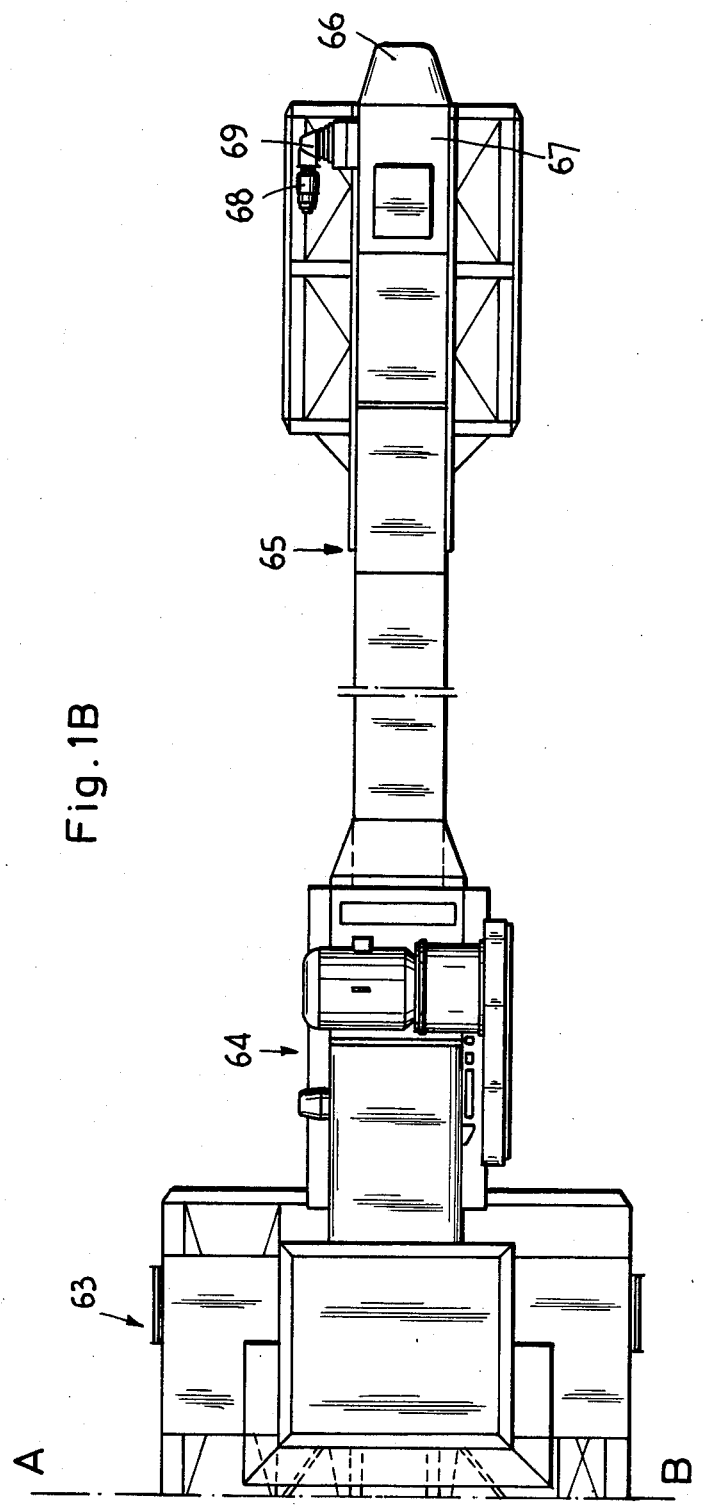
FIG. 1B shows a partial plan view of the right side portion of the crusher system shown in FIG. 1A, this right side portion of the crusher system being a continuation of the left side portion at line A-B.
Figure 2A:
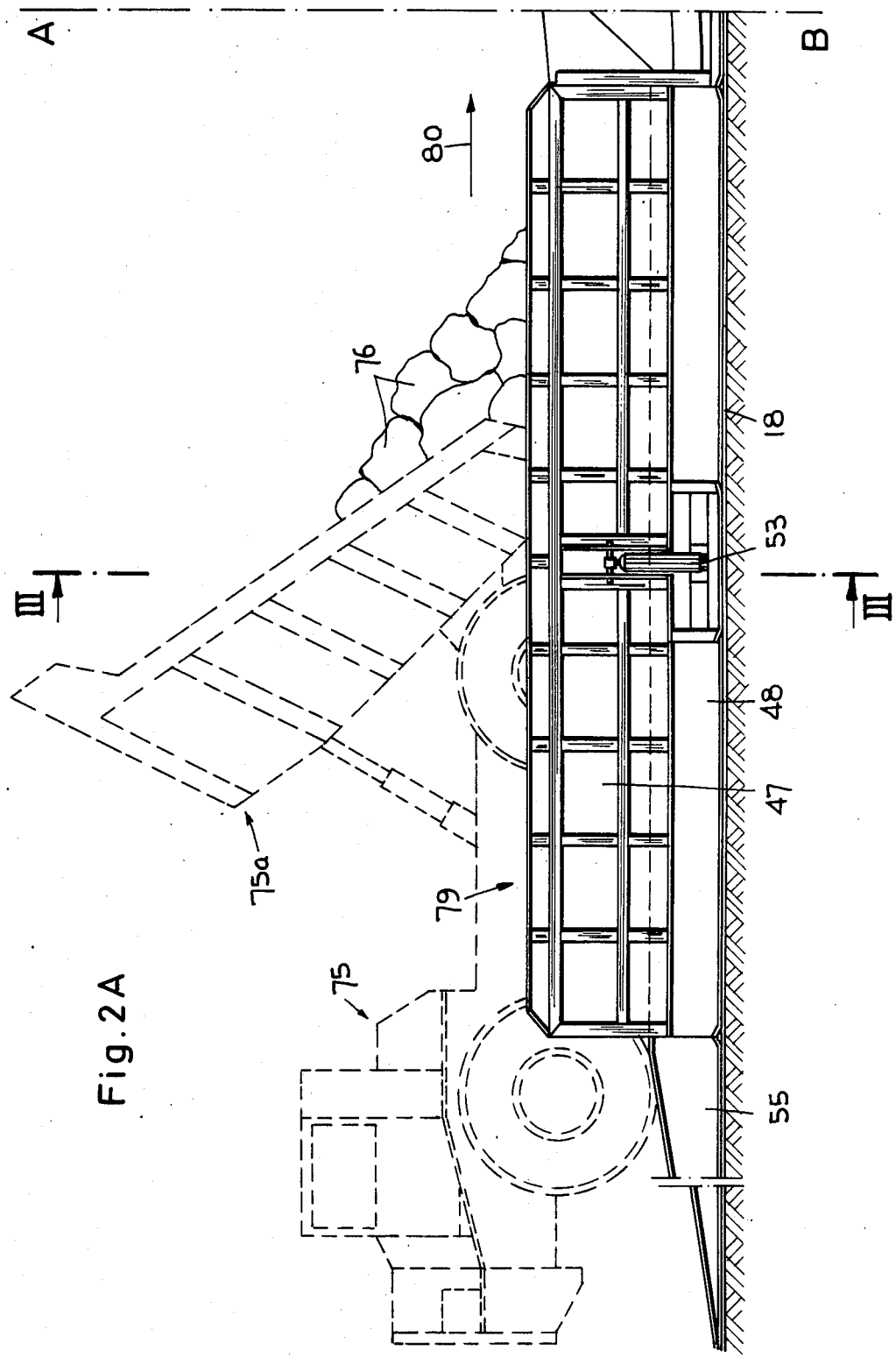
FIG. 2A shows a partial side elevation of the left side portion of the crusher system that is shown in FIG. 1A.
Figure 2B:
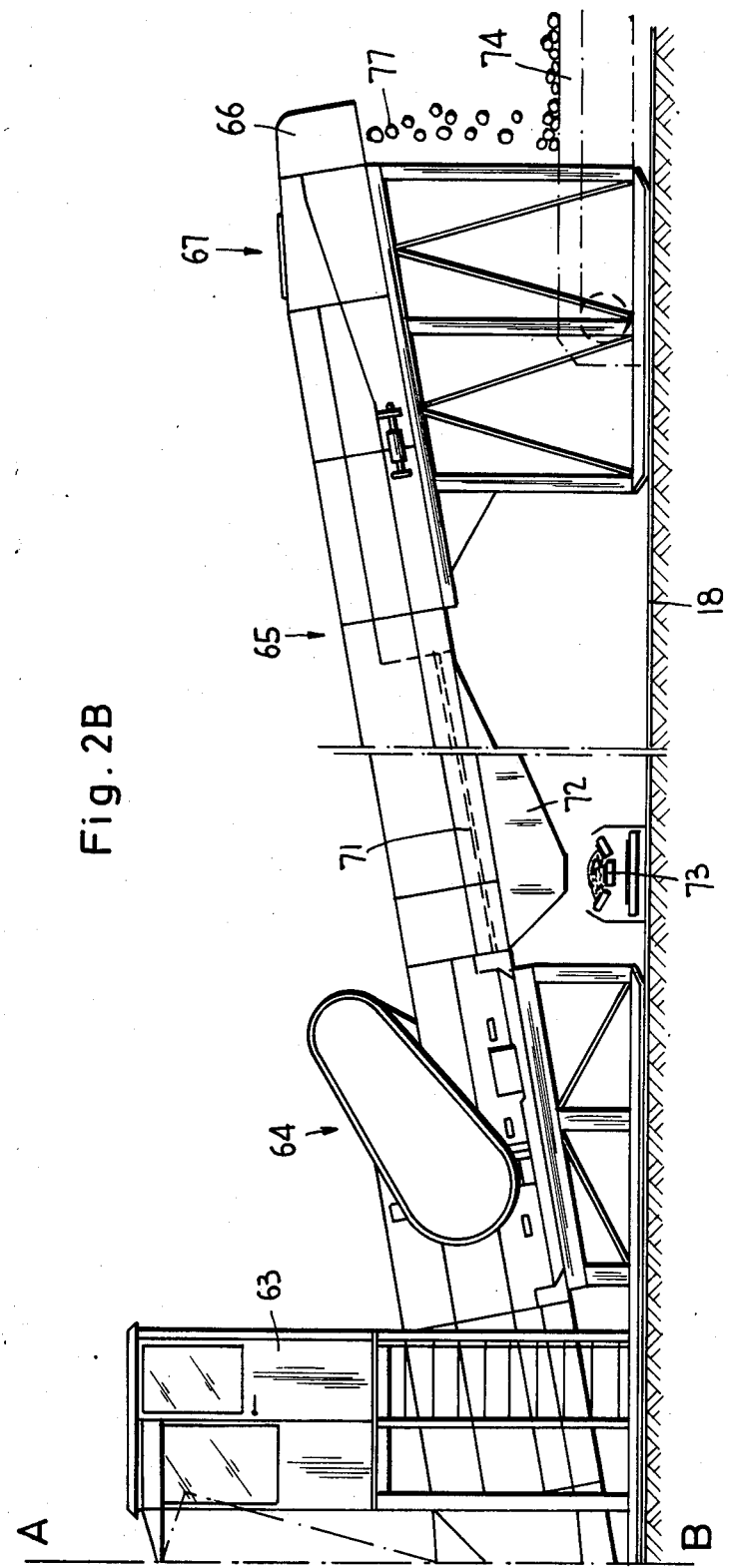
FIG. 2B shows a partial side elevation of the right side portion of the crusher system that is shown in FIG. 1B, this right side portion of the crusher system being a continuation of the left side portion in FIG. 2A at line A-B.

A mobile transfer station in the form of a mobile crusher system is shown in FIGS. 1A,1B,2A,2B, 3 and 4, this mobile crusher system including a feeder box which is constructed in accordance with a first embodiment of the present invention. The crusher system includes the feeder box 19, a control compartment 63 (optional), a crusher 64 and a connecting trough 65, as well as an endless conveyor 60 which continuously moves in a rectilinear fashion above the ground 18 from a non-extendible reversal mechanism 70 located in front of the upstream end of the feeder box 19, through the feeder box 19, through the control compartment 63, through the crusher 64 and along the connecting trough 65 to a driving frame 67 which is located at the downstream end of the connecting trough. The endless conveyor 60, which is in the form of a scrapper chain conveyor, acts to move the bulk material, e.g., coal, which may contain large lumps, in a rectilinear direction 80 from the feeder box 19 through the crusher 64 and then along the connecting trough 65 for ultimate discharge. When passing along the connecting trough 65, pieces of crushed material having a grain size of, e.g., less than 30 mm, will drop through a screen 71 and, via a funnel 72, fall onto a conveyor belt 73, while the pieces of crushed material having a grain size of, e.g., more than 30 mm, will move along to the chute 66 located at the downstream end of the connecting trough 65 and be dropped as pieces 77 onto a separate conveying system 74. The driving frame 67 is rotated by an axial flow piston constant motor 68 that is connected thereto via planetary gears 69.

The feeder box 19 is seen to comprise two separate feeder devices 20 and 40 which are positioned along corresponding opposite sides of the endless conveyor 60. Each feeder device includes a respective box compartment 21,41, and a respective support structure 28,48.

Each box compartment 21,41 includes a generally flat floor 22,42 and a side wall 27,47. Each floor 22,42 has opposite elongated sides 23,43 and 24,44 which extend generally in parallel with the rectilinear direction of movement of the endless conveyor 60, and opposite narrow sides 25,45 and 26,46. The elongated sides 23,43 are nearest the associated sides 61,62 of the endless conveyor 60 whereas the elongated sides 24,44 are remote therefrom. The narrow sides 25,45 are at the upstream end of the associated box compartment while the narrow sides 26,46 are at the downstream end. The side walls 27,47 are rigidly connected to the associated floors 22,42 to extend upwardly from their respective elongated sides 24,44. End walls (not labeled) are connected between the narrow sides 26,46 and the side walls 27,47.

Each support structure 28,48 includes an arm 29,49 which extends towards and somewhat over and above the adjacent side 61,62 of the endless conveyor 60, and each includes a lateral end 32,52 which extends away from the endless conveyor 60 to a point beyond the side wall 27,47 of the associated box compartment 22,42. Each support arm 29,49 includes a pivot means 30,50 near its free end which is connected to a cooperating means (not shown) extending below to the associated floor 22,42 to enable the associated box compartment 21,41 to either tilt thereabout towards the endless conveyor 60 or to return to a non-tilted orientation wherein the box compartment rests on the associated support structure (the floor thereof being in a generally horizontal orientation).

Figure 3:
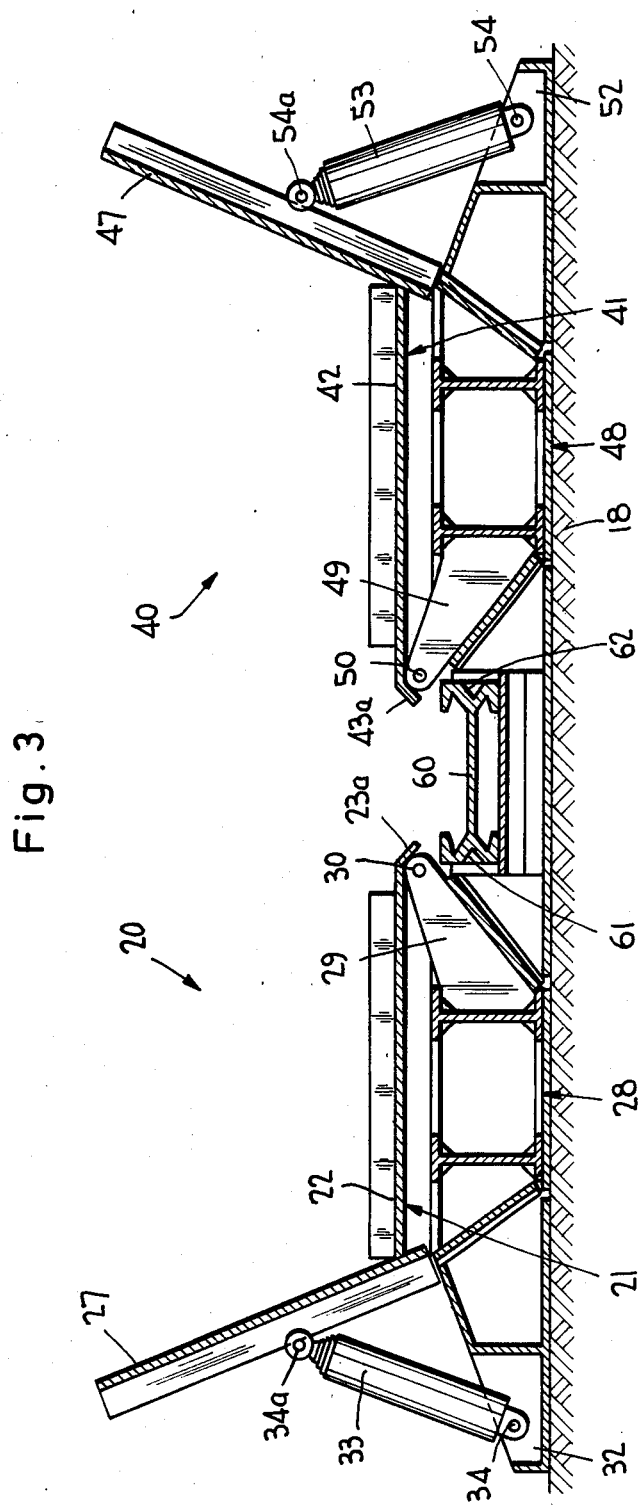
FIG. 3 shows a cross sectional view of the crusher system shown in FIGS. 1A and 1B as seen along line III—III in FIG. 1A, the view showing a cross section of the feeder box therein, the two half portions of which are shown in their non-tilted orientations.
Figure 4:
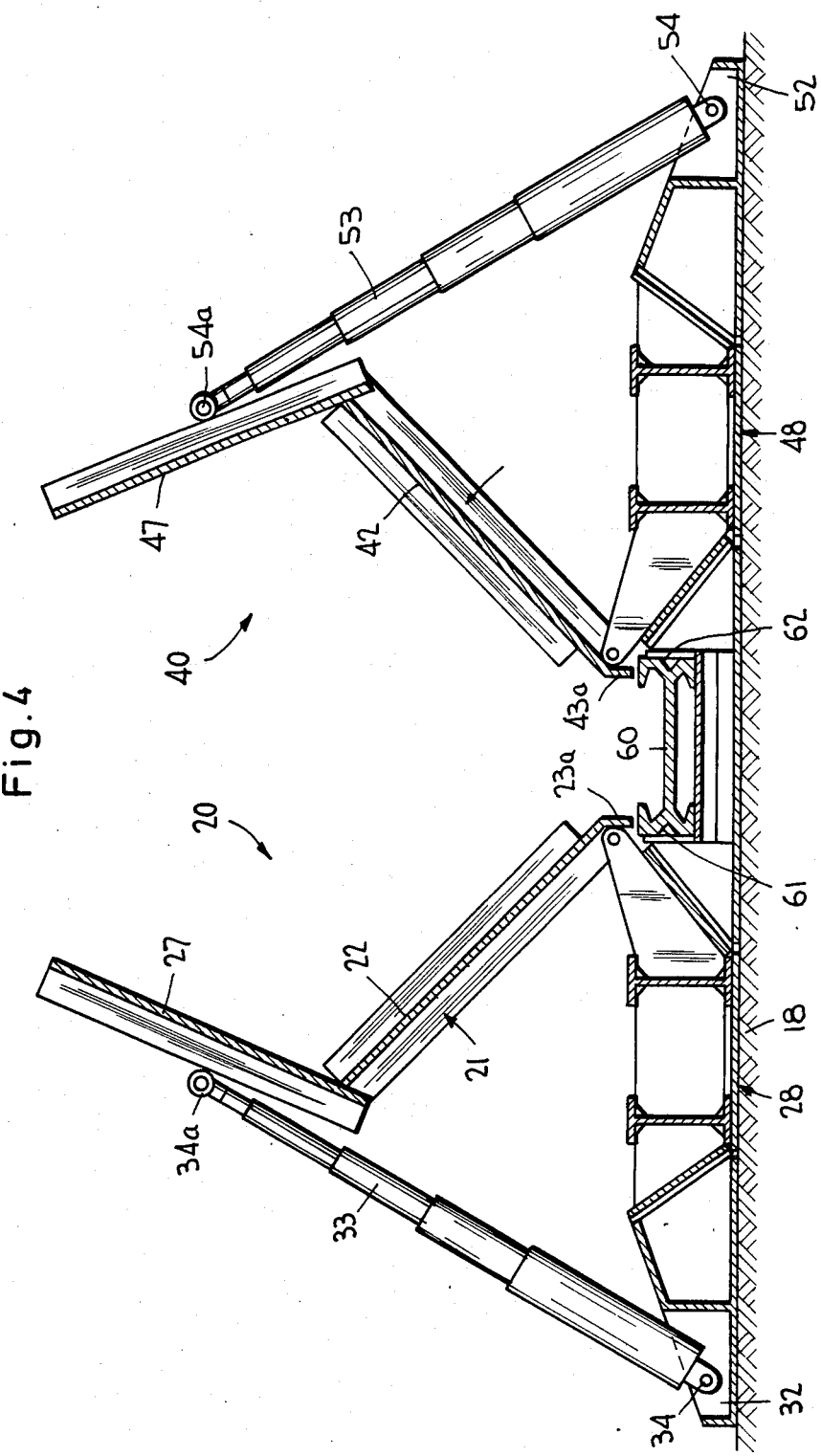
FIG. 4 shows a similar cross sectional view to that shown in FIG. 3 but wherein the two half portions of the feeder box are shown in their tilted orientations.
Figure 6B:
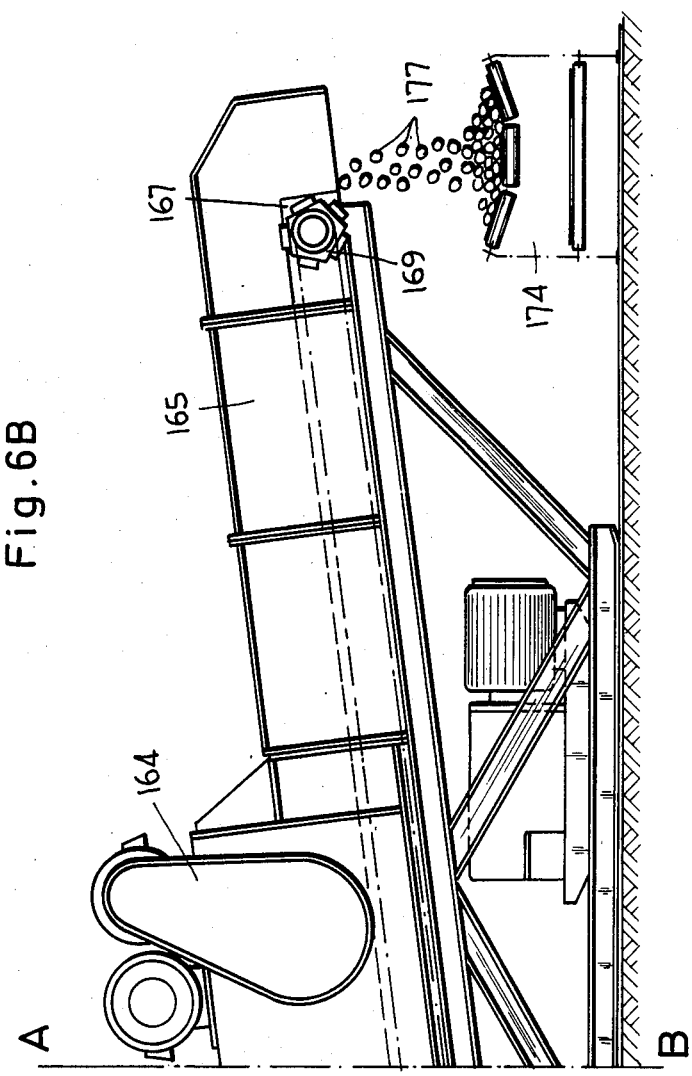
FIG. 6B shows a side elevation of the right side portion of the crusher system that is shown in FIG. 5B, the right side portion of the crusher system being a continuation of the left side portion in FIG. 6A at line A-B.

In addition, each feeder device includes a lifting cylinder 33,53 which is connected between a pivot 34,54 in the lateral end 32,52 of the associated support structure and a pivot 34a, 55a on the back of the side wall 27,47 of the associated box compartment for determining the orientation of the associated box compartment about the pivot means 30,50. When in their non-tilted orientations, bulk materials can be deposited in each box compartment; when in their tilted orientations, the bulk materials therein will be dumped into the endless conveyor 60. The lifting cylinders are supplied with a hydraulic operating fluid by a hydraulic supply system (not shown). As shown in FIGS. 3 and 4 the elongated sides 23,43 of the floors 22,42 are sloped downwardly to form lips 23a, 43a which help prevent bulk materials which are being discharged from the respective box compartments onto the endless conveyor 60 from spilling onto the ground 18 along the respective sides 61,62 of the endless conveyor 60.

Each feeder device also includes a ramp 35,55 which extends upwardly to the upstream side 25,45 of the floor 22,42. These ramps enable a dump truck 75 carrying bulk material 76 in its tiltable bed 75a to back up onto the floors 22,42 of the box compartments to deposit the bulk material 76 thereon. The ramps 35,55 are connected together, and thus stabilized, by a connecting rod 36.

The inventive feeder box 19 will operate in conjunction with the moving conveyor 60, the crusher 64 and the connecting trough 65 as follows. With the box compartment 21,41 of each feeder device 20,40 initially in its non-tilted orientation, a truck 75 carrying bulk materials 76 with large lumps in its tiltable bed 75a is backed up the ramps 35,55 and onto the floors 22,42 of the two box compartments and its bed 75a tilted to dump the bulk materials onto the floors 22,42 i.e., as the truck 75 drives forwardly out of the feeder box. Then the lifting cylinders 33,53 are caused to expand using a suitable hydraulic fluid, such that the box compartments 21,41 will swivel about the pivot means 30,50 on the arms 29,49 of the support structures 28,48. The bulk materials 76 in the box compartments will then slide downwardly over the lips 23a, 43a of the floors 22,42 and be deposited on the moving conveyor 60, whereafter it is carried through the control compartment 63 and the crusher 64 (where it is crushed) to be then dropped onto either conveyor 73 or the conveyor 74. After all the bulk materials have been discharged from the box compartments 21,41, the lifting cylinders 33,53 are caused to retract, such that the box compartments 21,41 will be lowered back onto the support structures 28,48, i.e., so as to be again ready for loading with bulk materials.

Turning now to the mobile transfer station in the form of a mobile crusher system shown in FIGS. 5A, 5B, 6A, 6B and 7, this system utilizing a feeder box in accordance with a second embodiment of the present invention, it is seen to include a feeder box 119, a control compartment 163 (optional), a crusher 164 and a connecting trough 165, as well as an endless conveyor 160 which continuously moves in a rectilinear fashion above the ground 118 from a return mechanism 170 at the upstream end of the feeder box 119, through the feeder box 119, through the control compartment 163, through the crusher 164 and along the connecting trough 165 to the drive mechanism 167 at the downstream end thereof. The drive mechanism 167 is rotated by hydraulic motors 168 and 169 (see FIG. 5B). The crushed bulk material 177 is discharged at the downstream end of the connecting trough 165 onto a conveyor 174 which moves in a direction which is perpendicular to the rectilinear direction 180 of movement of the endless conveyor 160.

The feeder box 119 is seen to comprise two feeder devices 120,140 which are positioned along corresponding opposite sides of the endless conveyor 160. Each feeder device 120,140 includes a respective box compartment 121,141 and a respective support structure 128,148.

Each box compartment 121,141 includes a generally flat floor 122,142 and a side wall 127,147. Each floor has opposite elongated sides 123,143 and 124,144 which extend generally in parallel with the rectilinear direction of movement of the endless conveyor 160, and opposite narrow sides 125,145 and 126,146. The elongated sides 123,143 are nearest the associated sides of the endless conveyor 160, while the opposite elongated sides 124,144 are remote therefrom. The side walls 127,147 are rigidly connected to the associated floors 122,142 to extend upwardly from their respective elongated sides 124,144. End walls (not labeled) are connected between the narrow sides 125,145 and 126,146 and the side walls 127,147.

Each support structure 128,148 includes a first arm 129,149 which is adjacent the associated side of the endless conveyor 160 and extends generally vertically thereabove, a bottom plate 131,151 and a second arm 132,152 which extends away from the endless conveyor. Each arm 129,149 includes a pivot means 130,150 at its upper end which is connected to a cooperating means extending below the associated floor 122,142 of the box compartment 121,141 to enable the associated box compartment to either tilt thereabout towards the endless conveyor 160 or to return to a non-tilted orientation wherein the box compartment rests on its associated support structure.

Figure 7:
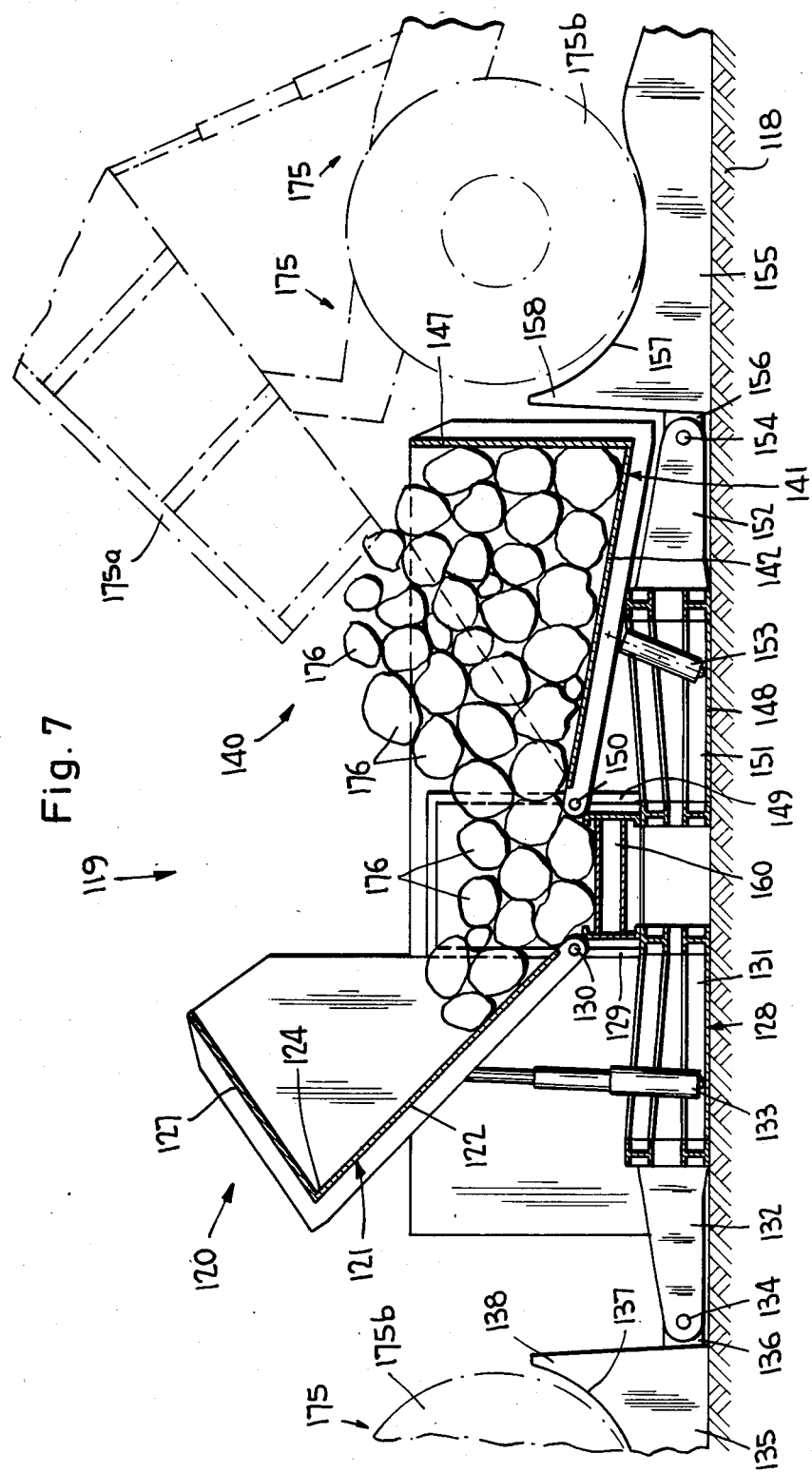
FIG. 7 shows a cross sectional view of the crusher system shown in FIGS. 5A, 5B, 6A and 6B as seen along line VII—VII in FIG. 6A, the view showing a cross section of the feeder box therein, the left half portion thereof being shown in a tilted orientation and the right half portion thereof being shown in its non-tilted orientation.
Figure 9B:
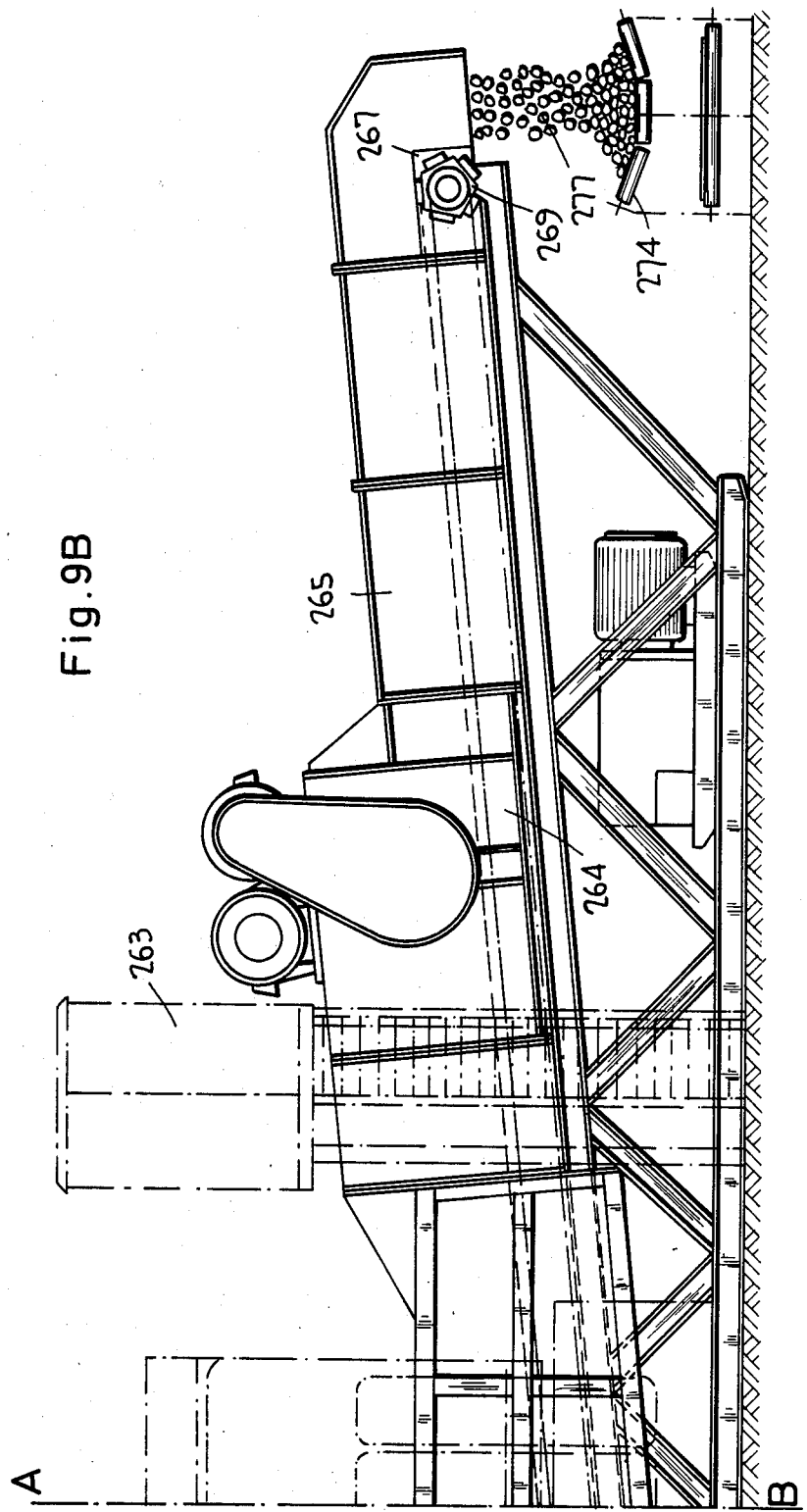
FIG. 9B shows a side elevation of the right side portion of the crusher system that is shown in FIG. 8B, this right side portion of the crusher system being a continuation of the left side portion in FIG. 9A at line A-B.
Figure 10:
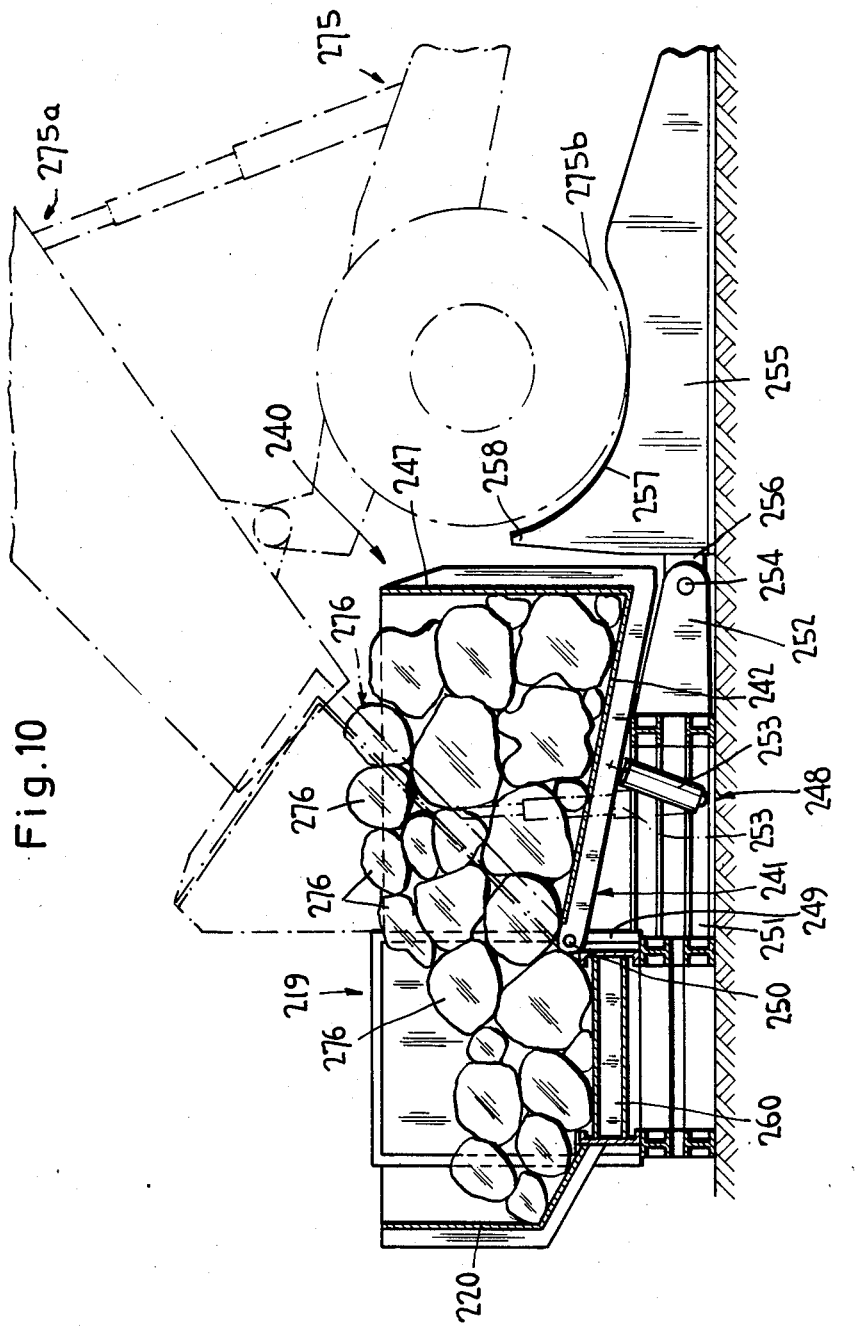
FIG. 10 shows a cross sectional view of the crusher system shown in FIGS. 8A, 8B, 9A and 9B as seen along line X—X in FIG. 9A, the view showing a cross section of the feeder box therein, the tiltable portion of which is shown both in its non-tilted (solid lines) and tilted (phantom lines) orientations.

In addition, each feeder device 120,140 includes a lifting cylinder 133,153 which is connected between the bottom plate 131,151 of the support structure 128,148 and the floor 122,142 of the associated box compartment 121,141 for determining whether or not the associated box compartment is in its non-tilted orientation about the pivot means 130,150, such that bulk materials can be deposited therein (see orientation of box compartment 141 in FIG. 7), or in its tilted orientation about the pivot means 130,150, during which the bulk materials therein will be dumped onto the endless conveyor 160 (see orientation of box compartment 121 in FIG. 7). The lifting cylinders are supplied with a hydraulic operating fluid by a hydraulic supply system (not shown).

Each feeder device 120,140 also includes a pair of ramps 135,155 which are located just beyond the side wall 127,147 of the associated box compartment, each ramp 135,155 including a bearing flange 136,156 for pivotal attachment to a bearing 134,154 at the end of the second arm 132,152 of each support structure 128,148. The upper surface of each ramp 135,155 includes a depression 137,157 which terminates in a stop wall 138,158 therein so as to provide an abutment stop for the rear wheels 175b of a dump truck 175 which has backed up onto one or the other pair of ramps to dump bulk materials 176 in its tiltable bed 175a over the side wall 127,147 and onto the floor 122,142 of the associated box compartment 121,141.

The inventive feeder box will operate in conjunction with the endless conveyor 160, the crusher 164 and the connecting trough 165 as follows. For each box compartment 121,141 of the feeder devices 120,140 which is in its non-tilted orientation, a dump truck 175 carrying bulk materials 176 with large lumps in its tiltable bed 175a is backed up the ramp pairs 135,155 associated with the non-tilted feeder device 120,140 until its rear wheels 175b are positioned in the depressions 137,157 therein, and its bed 175b is then tilted upwardly to dump its contents over the side wall of the associated box compartment (see right hand side of FIG. 7). Thereafter, the bed 175b is tilted back down and the truck driven away, and the lifting cylinder 133,153 of the feeder device is then extended via a hydraulic fluid, such that the associated box compartment will swivel about the pivot means 130,150 on the support structure therebelow to dump its contents onto the endless conveyor 160 (see left hand side of FIG. 7). Thereafter, the lifting cylinder will be retracted so as to reposition the associated box compartment back to its non-tilted orientation. In this non-tilted orientation the box compartment is ready for reuse. The two box compartments 121,141 can be thus be charged, loaded and then swiveled about their associated pivot means 130,150 either alternately or simultaneously, facilitating use of the feeder box.

Turning finally to the mobile transfer station in the form of a crusher system shown in FIGS. 8A, 8B, 9A, 9B and 10, this system utilizing a feeder box in accordance with a third embodiment of the present invention, it is seen to include a feeder box 219, a control compartment 263 (optional), a crusher 264 and a connecting trough 265, as well as an endless conveyor 260 which continuously moves in a rectilinear fashion above the ground 218 from a return mechanism 270 at the upstream end of the feeder box 219, through the feeder box 219, through the control compartment 263, through the crusher 264, and along the connecting trough 265 to the drive mechanism 267 at the downstream end thereof. The drive mechanism 267 is rotated by hydraulic motors 268 and 269. The crushed bulk material 277 is discharged at the downstream end of the connecting trough 265 onto a conveyor 274 which moves in a direction which is perpendicular to the rectilinear direction of movement 280 of the endless conveyor 260.

The feeder box 219 is seen to comprise a stationary wall 220 which is adjacent one side of the endless conveyor 260 and extends thereabove and a feeder device 240 which is positioned along the corresponding opposite side of the endless conveyor 260. The feeder device 240 comprises a box compartment 241 and a support structure 248.

The box compartment 241 includes a generally flat floor 242 and a side wall 247. The floor 242 has opposite elongated sides 243,244 which extend generally in parallel with the rectilinear direction of movement of the endless conveyor 260, and opposite narrow sides 245,246. The elongated side 243 is nearest to the associated side of the endless conveyor 260, while the elongated side 244 is remote therefrom. The side wall 247 is rigidly connected to the floor 242 so as to extend upwardly from its elongated side 243. End walls (not labeled) are connected between the narrow sides 245,246 and the side wall 247.

The support structure 248 includes a first arm 249 which is adjacent the associated side of the endless conveyor 260 and extends generally vertically thereabove, a bottom plate 251, and a second arm 252 which extends away from the conveyor. The arm 249 includes a pivot means 250 at its upper end which is connected to cooperating means extending below the floor 242 to enable the box compartment 241 to either tilt thereabout towards the endless conveyor 260 or to return to a non-tilted orientation where the box compartment rests on the support structure.

The feeder device 240 also includes a lifting cylinder 253 which is connected between the bottom plate 251 and to the floor 242. This lifting cylinder 253 is supplied with a hydraulic operating fluid by a hydraulically operated hydraulic supply system (not shown) to control the orientation of the box compartment 241 about the pivot means 250.

The feeder device 240 also includes two pairs of ramps 255 which are located just beyond the side wall 247, each of the ramps 255 including a bearing flange 256 for pivotal attachment to a bearing 254 at the end of the second arm 252. The upper surface of each ramp 255 includes a depression 257 which terminates at a stop wall 258 therein so as to provide an abutment stop for the rear wheels 275b of one or more dump trucks 275 which have either simultaneously or alternately backed up onto the ramp pairs to dump bulk materials 276 from their tiltable beds 275a over the side wall 247 onto the floor 242 of the box compartment.

The inventive feeder box will operate in conjunction with the endless conveyor 260, the crusher 264 and the connecting trough 265 as follows. With the box compartment 241 initially in its non-tilted orientation, a dump truck 275 carrying bulk materials 276 with large lumps in its tiltable bed 275a is backed up one pair of the ramps 255 until its rear wheels 275b are positioned in the depressions 257 and its contents are then dumped over the side wall 247. After the bed of the dump truck is tilted back down and the truck driven away, the lifting cylinder 253 is extended such that the box compartment 241 will pivot about the pivot means 250 on the support structure to dump its contents onto the moving endless conveyor 260. The stationary wall 220 will provide a barrier for the bulk materials so that they will not spill over the opposite side of the endless conveyor 260. Thereafter, the lifting cylinder 253 will be retracted so as to reposition the box compartment 241 back to its non-tilted orientation, such that it rests on the support structure 248, ready for reuse.

Although three specific embodiments of the inventive feeder box have been shown and described, it will be apparent that many modifications can be made therein and still fall within the scope of the appended claims.

We claim:

1. A mobile transfer station for processing bulk materials supplied thereto, said mobile transfer station comprising a crusher mechanism for crushing the bulk materials conveyed thereto, an endless conveyor which extends through said crusher mechanism and is rectilinearly movable in a downstream direction to convey bulk materials to said crusher mechanism, said endless conveyor having opposite sides, and a feeder box for containing and dumping the bulk materials onto said endless conveyor upstream of said crusher mechanism, said feeder box including separate feeder devices positioned along respective opposite sides of said endless conveyor, each feeder device including a support structure which includes (1) an arm that extends towards said endless conveyor to a point over and above the adjacent side thereof, said arm including a pivot means, and (2) a lateral end which extends away from said endless conveyor, a box compartment located above said support structure, said box compartment including (1) a floor which has elongated opposite sides that extend generally in parallel with the rectilinear direction of movement of said endless conveyor, a first of said elongated opposite sides being adjacent to said endless conveyor and the second of said elongated opposites being remote from said endless conveyor, said floor being connected to the pivot means on the arm of the support structure therebelow to enable the box compartment to be tiltable towards said endless conveyor, (2) a side wall which extends upwardly from said remote side of said floor, (3) an open upstream end, and (4) a downstream end, a lifting cylinder connected between the lateral end of said support structure and side wall of said box compartment for tilting the box compartment upwardly about the pivot means to dump bulk materials therein onto said endless conveyor or for allowing the box compartment to tilt downwardly about the pivot means until the floor thereof rests on the support structure thereunder, and a ramp pivotally connected to the open upstream end of said box compartment to enable a truck to drive up and into the box compartment to deposit bulk materials to be processed therein.

2. The mobile transfer station as defined in claim 1, wherein the first side of the floor of the box compartment of each feeder device includes a lip which extends downwardly toward the top of the adjacent endless conveyor.

3. The mobile transfer station as defined in claim 1, wherein the floor of each box compartment includes narrow opposite sides, the first of said narrow opposite sides being upstream with respect to the rectilinear direction of movement of said endless conveyor and the second of said narrow opposite sides being downstream with respect to the rectilinear direction of movement of said endless conveyor, and wherein each said ramp pivotally attached to a box compartment is pivotally attached to the upstream side of the floor of the associated box compartment.

4. The mobile transfer station as defined in claim 1, wherein said endless conveyor is an endless chain scraper conveyor.

* * * * *